United States Patent
Tian et al.

(10) Patent No.: US 7,515,730 B2
(45) Date of Patent: Apr. 7, 2009

(54) PROGRESSIVE IMAGE QUALITY CONTROL USING WATERMARKING

(75) Inventors: Jun Tian, Tualatin, OR (US); John Stach, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 1209 days.

(21) Appl. No.: 10/319,413

(22) Filed: Dec. 13, 2002

(65) Prior Publication Data

US 2003/0179901 A1 Sep. 25, 2003

Related U.S. Application Data

(60) Provisional application No. 60/340,651, filed on Dec. 13, 2001.

(51) Int. Cl.
G06K 9/00 (2006.01)
H04L 9/00 (2006.01)
G06K 15/00 (2006.01)

(52) U.S. Cl. .......... 382/100; 358/3.28; 380/45; 380/264; 380/277; 713/176

(58) Field of Classification Search ......... 382/100; 358/3.28; 380/44–47, 264, 277–282; 713/176
See application file for complete search history.

(56) References Cited

U.S. PATENT DOCUMENTS

| | | | |
|---|---|---|---|
| 4,750,173 A | 6/1988 | Bluthgen | |
| 5,146,457 A | 9/1992 | Veldhuis et al. | |
| 5,646,997 A | 7/1997 | Barton | |
| 5,862,218 A * | 1/1999 | Steinberg | 713/176 |
| 6,101,604 A * | 8/2000 | Barton | 713/176 |
| 6,192,138 B1 | 2/2001 | Yamadaji | |
| 6,208,745 B1 * | 3/2001 | Florencio et al. | 382/100 |
| 6,215,421 B1 | 4/2001 | Kondo et al. | |
| 6,278,791 B1 | 8/2001 | Honsinger et al. | |
| 6,311,214 B1 | 10/2001 | Rhoads | |
| 6,490,681 B1 | 12/2002 | Kobayashi et al. | |
| 6,523,114 B1 | 2/2003 | Barton | |
| 6,546,139 B1 | 4/2003 | Kondo et al. | |

(Continued)

FOREIGN PATENT DOCUMENTS

EP 614308 A1 * 9/1994

(Continued)

OTHER PUBLICATIONS

De Vleeschouwer et al, "Circular interpretation of histogram for reversible watermarking," IEEE Fourth Workshop on Multimedia Signal Processing, pp. 345-350, Oct. 2001.

(Continued)

*Primary Examiner*—Matthew C Bella
*Assistant Examiner*—Anthony Mackowey

(57) ABSTRACT

The ability to remove a watermark from an encoded image by reversible watermarking opens the possibility of various novel applications. Several such applications are detailed. One permits different classes of consumers to gain access to different versions of an image. A pristine image is intentionally degraded in some fashion, and distributed to consumers. By reference to one or more watermarks in the degraded image, some or all of the degradation can be removed, or transformed to a less-objectionable state. Through such arrangements, image consumers with different needs can gain access to versions of the image having differing qualities.

18 Claims, 4 Drawing Sheets

U.S. PATENT DOCUMENTS

| | | | |
|---|---|---|---|
| 6,577,746 | B1 | 6/2003 | Evans et al. |
| 6,633,652 | B1 | 10/2003 | Donescu |
| 6,668,246 | B1 | 12/2003 | Yeung et al. |
| 6,671,376 | B1* | 12/2003 | Koto et al. .................. 380/210 |
| 6,931,534 | B1* | 8/2005 | Jandel et al. ................ 713/176 |
| 6,947,571 | B1 | 9/2005 | Rhoads et al. |
| 7,006,656 | B2* | 2/2006 | Fridrich et al. .............. 382/100 |
| 7,006,662 | B2 | 2/2006 | Alattar et al. |
| 2001/0021260 | A1 | 9/2001 | Chung et al. |
| 2001/0021926 | A1* | 9/2001 | Schneck et al. ............... 705/54 |
| 2001/0044899 | A1 | 11/2001 | Levy |
| 2001/0054146 | A1 | 12/2001 | Carro et al. |
| 2002/0009208 | A1* | 1/2002 | Alattar et al. ............... 382/100 |
| 2002/0013903 | A1 | 1/2002 | Le Floch |
| 2002/0027994 | A1* | 3/2002 | Katayama et al. ........... 380/269 |
| 2002/0040433 | A1 | 4/2002 | Kondo |
| 2002/0059238 | A1* | 5/2002 | Saito ............................. 707/9 |
| 2002/0059520 | A1 | 5/2002 | Murakami et al. |
| 2002/0069359 | A1* | 6/2002 | Watanabe .................... 713/176 |
| 2002/0080964 | A1* | 6/2002 | Stone et al. .................. 380/255 |
| 2002/0083324 | A1 | 6/2002 | Hirai |
| 2002/0094083 | A1* | 7/2002 | Bhattacharya et al. ...... 380/231 |
| 2002/0114463 | A1 | 8/2002 | Pelly et al. |
| 2002/0118859 | A1 | 8/2002 | Stone et al. |
| 2002/0124173 | A1 | 9/2002 | Stone |
| 2002/0131617 | A1 | 9/2002 | Pelly et al. |
| 2002/0146123 | A1 | 10/2002 | Tian |
| 2002/0171853 | A1 | 11/2002 | Wu |
| 2002/0199106 | A1 | 12/2002 | Hayashi |
| 2003/0009669 | A1* | 1/2003 | White et al. ................. 713/176 |
| 2003/0012403 | A1 | 1/2003 | Rhoads et al. |
| 2003/0026421 | A1* | 2/2003 | Morlet ........................ 380/203 |
| 2003/0033529 | A1* | 2/2003 | Ratnakar et al. ............ 713/176 |
| 2003/0053653 | A1 | 3/2003 | Rhoads |
| 2003/0081809 | A1 | 5/2003 | Fridrich et al. |
| 2003/0120926 | A1* | 6/2003 | Fukushima et al. ......... 713/176 |
| 2003/0149879 | A1 | 8/2003 | Tian et al. |
| 2004/0088556 | A1* | 5/2004 | Weirauch .................... 713/193 |
| 2005/0185820 | A1* | 8/2005 | Yoshida et al. .............. 382/100 |

FOREIGN PATENT DOCUMENTS

| | | |
|---|---|---|
| EP | 1 220 152 | 11/2002 |
| WO | 99/17537 | 4/1999 |
| WO | 02/089056 | 7/2002 |

OTHER PUBLICATIONS

Domingo-Ferrer et al, "Invertible spread-spectrum watermarking for image authentication and multilevel access to precision-critical watermarked images," Proc. IEEE Int'l Conf on Information Technology Coding and Computing, pp. 152-157, Apr. 2002.

Fridrich et al, "Invertible authentication," Proc. SPIE, vol. 4314, pp. 197-208, Jan. 2001.

Fridrich et al, "Invertible authentication watermark for JPEG images," Proc. IEEE Int'l Conf on Information Technology: Coding and Computing, pp. 223-227, Apr. 2001.

Fridrich et al, "Lossless data embedding for all image formats," Proc. SPIE, vol. 4675, pp. 572-583, Jan. 2002.

Goljan et al, "Distortion-free Data Embedding," *4th Information Hiding Workshop*, LNCS vol. 2137, pp. 27-41, Apr. 2001.

Fridrich et al, Lossless Data Embedding—New Paradigm in Digital Watermarking, *EURASIP, Emerging Applications of Multimedia Data Hiding*, vol. 2002, No. 2, pp. 185-196, Feb. 2002.

Park et al, "Invertible semi-fragile watermarking algorithm distinguishing MPEG-2 compression from malicious manipulation," IEEE International Conference on Consumer Electronics, pp. 18-19, Jun. 2002.

Tian, "Wavelet-based reversible watermarking for authentication," Proc. SPIE, vol. 4675, pp. 679-690, Jan. 2002.

Tian, "Wavelet-based image compression and content authentication," Proc. SPIE, vol. 4551, pp. 11-20, Oct. 22, 2001.

Celik et al., "Reversible Data Hiding," Proc. Int. Conv. Image Processing, vol. II, Sep. 2002, pp. 157-160.

Celik et al, "Lossless Generalized-LSB Data Embedding," IEEE Trans. Image Processing, submitted for publication, Jul. 2002, 14 pages.

Fridrich et al., "Lossless Data Embedding—New Paradigm in Digital Watermarking," EURASIP J. Appl. Signal Processing, vol. 2002, No. 2, Feb. 2002, pp. 185-196.

Kalker et al, Capacity Bounds and Constructions for Reversible Data Hiding, Proc. $14^{th}$ Int. Conf. Digital Signal Processing, vol. 1, Jul. 2003, pp. 71-76.

Tian, "Reversible Watermarking by Difference Expansion," Proc. Workshop on Multimedia and Security, Dec. 2002, pp. 19-22.

Tian, "Reversible Data Embedding Using a Difference Expansion," IEEE Tran. Circuits and Systems for Video Technology, vol. 13, pp. 890-896, Aug. 2003.

Bartolini et al, "Image Authentication Techniques for Surveillance Applications," Proc. of IEEE, vol. 89, No. 10, Oct. 2001, pp. 1403-1418.

Craver et al, Can Invisible Watermarks Resolve Rightful Ownerships? IBM Research Report RC20509, 21 pages, 1996.

Dittmann et al, "Watermarking Protocols For Authentication And Ownership Protection Based On Timestamps And Holograms," Proc. SPIE, vol. 4675, pp. 240-251, Jan. 2002.

Fridrich et al, "Fragile Authentication Watermark for Images," ICIP 2000, Vancouver, Sep. 10-13, 2000.

Fridrich, "Methods for Tamper Detection in Digital Images," Proc. ACM Workshop on Multimedia and Security, Orlando, FL, Oct. 30-31, 1999, pp. 19-23.

Hara et al, An Improved Method of Embedding Data Into Pictures by Modulo Masking, IEEE Transactions on Communications vol. 36, No. 3, Mar. 1988.

Macq, "Lossless Multiresolution Transform For Image Authenticating Watermarking," *Proceedings of EUSIPCO*, Sep. 2000.

Xedeas et al, Embedding Data into Pictures by Modulo Masking, IEEE Transactions on Communications vol. Com-32, No. 1, Jan. 1984.

\* cited by examiner

PROGRESSIVE IMAGE QUALITY CONTROL USING WATERMARKING

RELATED APPLICATION DATA

This application claims priority to application Ser. No. 60/340,651, filed Dec. 13, 2001.

This application is also related to the following applications:

Provisional application Ser. No. 60/430,500, filed Dec. 2, 2002, entitled Applications of Reversible Watermarking by Tian et al;

Provisional application Ser. No. 60/430,511, filed Dec. 2, 2002, entitled Reversible Watermarking by Tian et al; and Application Ser. No. 10/319.404, filed Dec. 12, 2002, entitled Reversible Watermarking by Tian et al.

BACKGROUND AND SUMMARY OF THE INVENTION

The cited patent applications teach high capacity digital watermarks that can be completely removed, restoring a watermarked content object (e.g., an image) to its original, pristine state. (See also Tian, "Wavelet-Based Reversible Watermarking for Authentication," Proc. of SPIE, Vol. 4675, pp. 679-690, January 2002; and Tian, "Reversible Watermarking by Difference Expansion," Proc. Multimedia Security Workshop, Dec. 6, 2002.)

Other reversible watermarking techniques are also known, e.g., in U.S. Pat. Nos. 5,646,997 and 6,278,791, and in Fridrich et al, "Lossless Data Embedding for All Image Formats," Proc. SPIE, Vol. 4675, pp. 572-583, January 2002; Dittmann et al, "Watermarking Protocols For Authentication And Ownership Protection Based On Timestamps And Holograms," Proc. SPIE, Vol. 4675, pp. 240-251, January, 2002; Fridrich et al, "Invertible Authentication," Proc. SPIE, Vol. 4314, pp. 197-208, January, 2001; Macq, "Lossless Multiresolution Transform For Image Authenticating Watermarking," *Proceedings of EUSIPCO*, September 2000; Vleeschouwer et al, "Circular Interpretation Of Histogram For Reversible Watermarking," *Proceedings of IEEE 4th Workshop on Multimedia Signal Processing*, October 2001; Kalker et al, "Capacity bounds And Constructions For Reversible Data Hiding," *Proceedings of the 14th International Conference on Digital Signal Processing*, volume 1, pages 71-76, July 2002; and Celik et al, "Reversible Data Hiding," *Proceedings of International Conference on Image Processing*, volume II, pages 157-160, September 2002. Other reversible watermarking techniques will doubtless be developed in the future.

The ability to remove a watermark from an encoded image opens the possibility of various novel applications. Several such applications are detailed herein.

One application employs a reversible (frail) watermark in conjunction with a second (robust) watermark. The payload of the reversible watermark conveys information about the robust watermark (e.g., encoding parameters, or an error signal), permitting removal of the robust watermark from an uncorrupted encoded image. By such arrangements, the encoded image can be fully restored to its pristine, unencoded state even if several different watermarks have been applied.

In a related application, the information about the robust watermark can be stored in a memory, and accessed through linking data encoded in one of the watermarks.

In all such arrangements, after the watermarks have been removed, an image hash can be computed and checked against a hash made prior to any watermarking, to confirm perfect restoration of the image to its original state. (The latter hash can be conveyed with the image via one of the watermarks, or it can be stored in a memory and accessed through linking data encoded in one of the watermarks.)

Another application permits different classes of consumers to gain access to different versions of an image. A pristine image is intentionally degraded in some fashion, and distributed to consumers. By reference to one or more watermarks in the degraded image, some or all of the degradation can be removed, or transformed to a less-objectionable state. (The degradation may be that introduced by watermark encoding, or of another form.) Through such arrangements, image consumers with different authorization rights can gain access to versions of the image having differing qualities.

Various combinations of the foregoing and other arrangements are also contemplated.

These and other features and advantages enabled by the present invention will be more readily apparent from the following detailed description, which proceeds with reference to the accompanying drawings.

DETAILED DESCRIPTION

Figure 1:
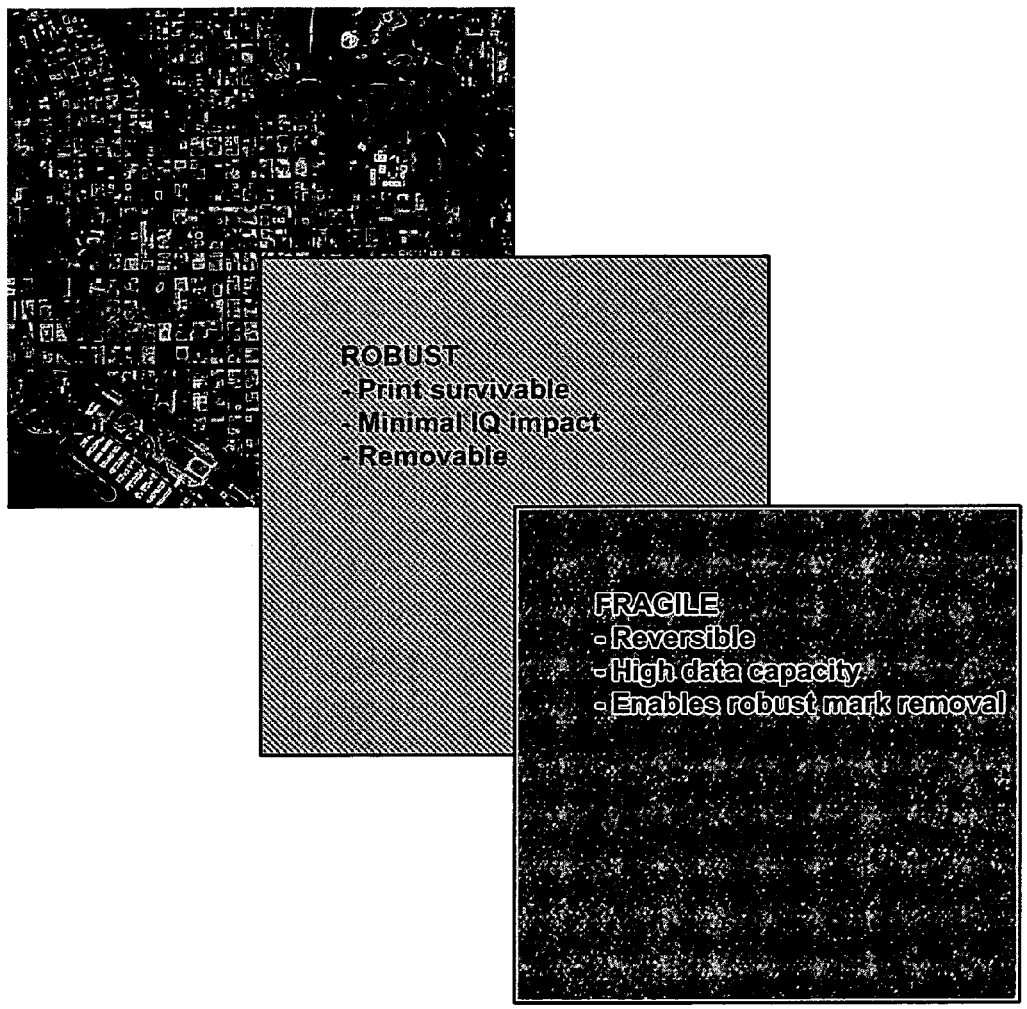
FIG. 1 pictorially shows the combination of an original image with both a robust watermark and a fragile watermark.
Figure 2:
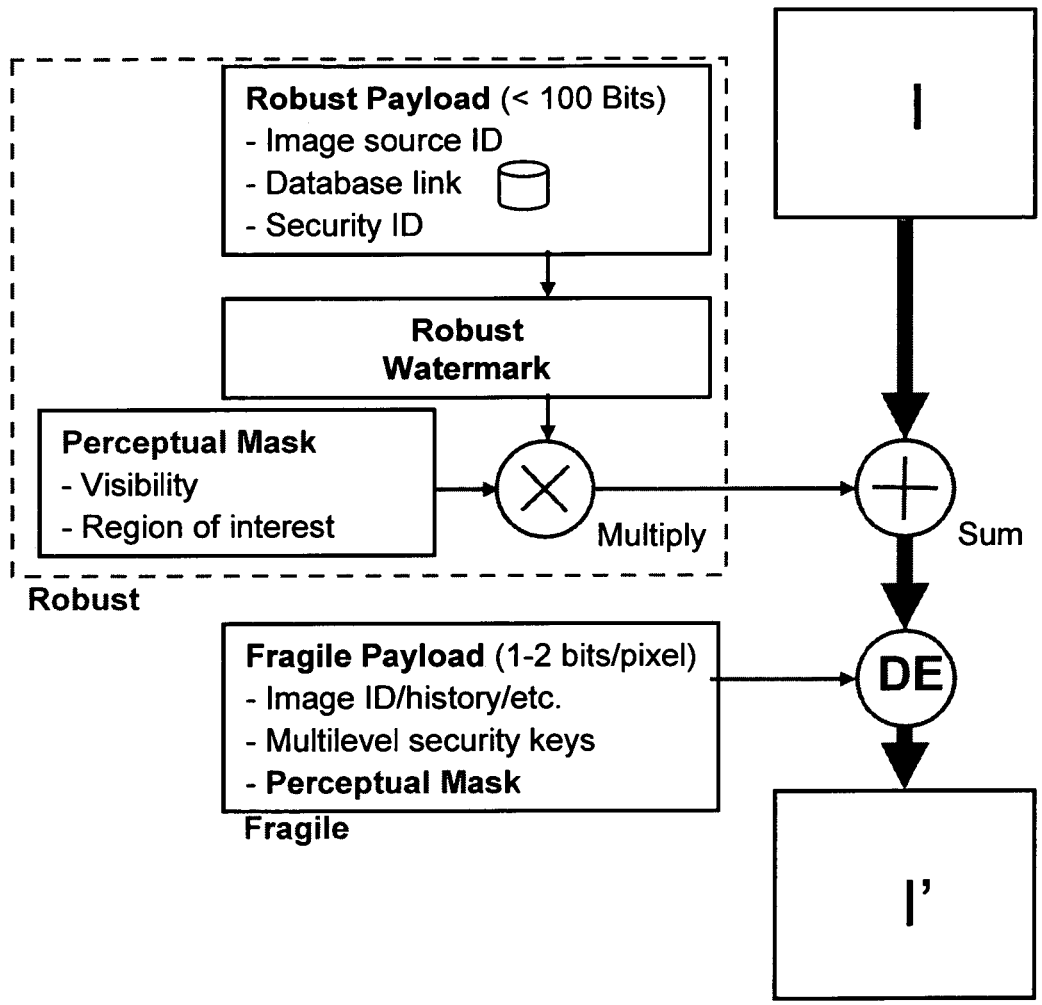
FIG. 2 is a flowchart of a watermark embedding process used in an exemplary embodiment of the present invention.
Figure 3:
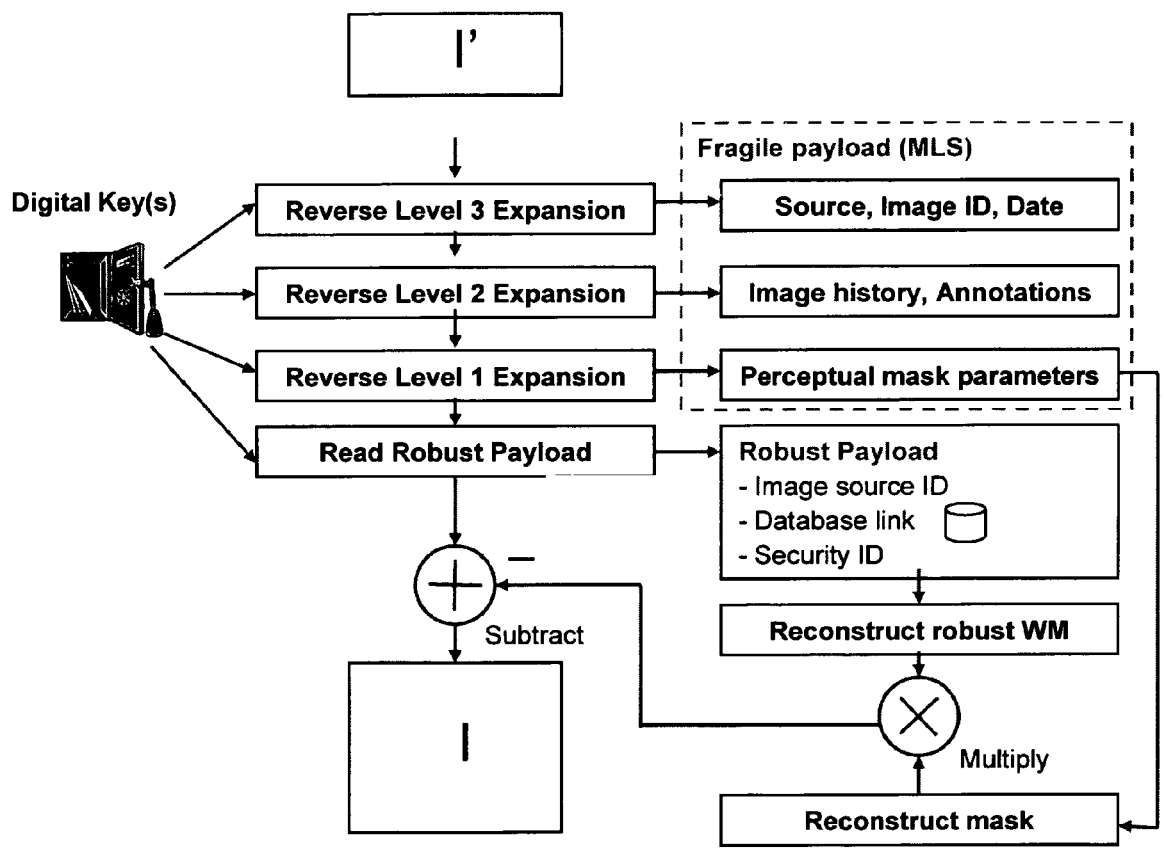
FIG. 3 is a flowchart of a watermark removal process used in conjunction with the method of FIG. 2.

Referring to FIGS. 1-3, one embodiment according to the present invention encodes a content object (e.g., an image) with two watermarks, in a manner permitting removal of both marks.

The first watermark is robust (i.e., it survives various image corruptions and manipulations such as image scaling, rotation, cropping, printing/scanning, or lossy compression) and conveys a first set of payload data. It is encoded in a manner that leaves essentially no human-apparent evidence of alteration to the image. (A suitable robust watermark is taught in copending application Ser. No. 09/503,881, filed Feb. 14, 2000. now U.S. Pat. No. 6,614,914.)

The second watermark may or may not be robust, but is reversible. That is, the effects of its encoding can be completely removed from the host image. (In an illustrative embodiment, a reversible watermark of the sort described in the earlier-cited Tian work is employed.) This second watermark conveys a payload that includes—among other possible elements—data that enables encoding artifacts due to the first watermark to be substantially (or completely) removed from the image.

Referring more particularly to FIG. 2, one exemplary embodiment first sums an original image I with the first, robust watermark, and then processes the result according to the difference expansion ("DE") technique disclosed in the Tian patent applications to encode the second watermark, thereby yielding a final encoded image I'.

The first watermark is produced using the technique detailed in the '881 application, e.g., by taking a payload of data bits (e.g., 100 bits, representing image metadata such as image source identifier, an address data referring to a corresponding database record, and a security ID), generating a flat watermark signal therefrom, and then locally adapting the flat watermark signal in accordance with a perceptual mask. (The mask is generated from the image, and exploits perceptual attributes of the human visual system to concentrate the watermark energy in regions of the image where it will be less noticeable. Various human visual system models are known and can be employed for this purpose. Such models may take into account, e.g., reduced sensitivity to noise in areas of high spatial detail and high contrast.)

The payload of the second watermark can convey essentially any data, such as image metadata, date/time information, annotations by prior image users, digital signature or other authentication data, security keys, etc. In the illustrative Tian method, the second watermark payload is scrambled or encrypted, so that the recipient requires associated key data in order to interpret the decoded information. (The encoding algorithm may be independently keyed, so that a user without the key cannot decode any information.) In addition to other information, information characterizing the first watermark, e.g., the perceptual mask used in its encoding and any exceptions to the normal encoding process, is included in this reversible encoding.

Once encoded with these two watermarks, the image I' is distributed to image consumers.

Turning next to FIG. 3, the image I' is received by an image consumer and processed, e.g., to extract the watermarks' contents, and then to remove the watermarking artifacts from the image—returning it to its pristine state.

First, by reference to one or more keys with which the second watermark was encoded, the payload conveyed by the second watermark is read, and the changes introduced by the second watermark are reversed. A method complementary to that used in the encoding arrangement is used (i.e., if the Tian difference expansion encoding technique is used, a reciprocal difference expansion decoding technique is used).

Next, the first (robust) watermark is decoded—using a decoding process complementary to that by which it was originally encoded (e.g., as detailed in the '881 application).

Finally, the first (robust) watermark is removed—restoring the image to its unwatermarked state. To remove the first watermark, a flat watermark signal is re-created—using the payload earlier read from the first watermark and the original encoding algorithm. The perceptual mask data conveyed by the second watermark is then applied to the flat watermark (e.g., by multiplication) to recreate the same perceptually-adapted watermark that was earlier added to the original content signal. This perceptually adapted watermark is now subtracted from the image, returning the image to its unencoded state.

The foregoing process can be altered in a number of respects, a few of which are detailed below.

To fully remove the first (robust) watermark, the process by which it was originally encoded should be fully and accurately characterized. Thus, for example, if the encoding process made use of a spreading key or other secret information, this same information should be available to the recipient so that corresponding steps can be taken to remove the watermark. This secret information can be conveyed to the recipient as part of the payload of the first or second watermark, or may be known to the recipient through another channel.

Likewise, the process used to encode the first watermark may have exceptions that should be accounted for in the removal process. One exception is a rail condition, e.g., in which the algorithm used for encoding wants to make a change of +4 to a signal sample with an original 8-bit value of 254. Since 8 bits can only represent numbers in the range of 0-255, the encoder may clip the change to 1 (i.e., 254+1 equals the maximum value of 255). Data identifying such exceptions should be conveyed to the recipient (e.g., as part of a watermark payload or otherwise), so that on reversing the watermark, the exceptional sample is changed back by 1, to 254, instead of changed by 4 as the encoding algorithm might otherwise indicate.

In this and the later described embodiments, restoration of the image to its unwatermarked state can be confirmed through use of a hash (digital signature, checksum, digest, etc.). A hash of the image prior to watermarking can be computed, and this hash can be conveyed to the recipient as part of a watermark payload or otherwise. (SHA-256 is a suitable hash.) The recipient—after reversing the watermarks—can compute the same hash function and compare it against the conveyed hash. If the two hashes match, this indicates that the image has been correctly restored.

The payloads conveyed by the first and second watermarks can be uncompressed, but are more typically compressed using some form of lossless compress. Examples include run length encoding, Lempel-Ziv, etc.

In the illustrative Tian method, the second watermark can readily convey a payload in excess of 1 bit per 8-bit pixel. In some embodiments, a payload in excess of 2 bits per pixel can be achieved.

The use of two watermarks is exemplary. Many more watermarks can of course be used. As shown in FIG. 3, for example, a single robust watermark can be used in conjunction with three frail watermarks. One of the frail watermarks can convey static information about the encoded content, such as a source identifier, an image identifier, and a date of creation. A second of the frail watermarks can convey information that may evolve through use, such as a log showing the recipients to whom the content has been distributed (image history), annotations added by different recipients (e.g., diagnostic notes written by a radiologist, represented as ASCII data or as a bit-mapped graphic of handwriting on the image), etc. (These data types in the first and second watermark payloads may be considered image metadata.) A third of the frail watermarks can convey the encoding parameters (e.g., perceptual mask, exceptions) associated with encoding of the robust watermark. (In the Tian method of the illustrative embodiment, the frail watermarks also convey a map used in reversing these watermarks.) It will be understood that each of these three reversible watermarks has a separate key required for decoding/removal.

Some embodiments may be realized with only one watermark. If the watermark is reversible, its removal is straightforward using the techniques taught by Tian. If the watermark is "robust," it may still be removable without a companion reversible watermark conveying its encoding particulars.

For example, the robust watermark might not be perceptually-adapted to the image. That is, the image can be summed with a "flat" robust watermark. By use of a flat watermark, the amount of information required to completely characterize the robust watermark encoding is greatly reduced (i.e., the relatively voluminous perceptual adaptation data is omitted). If the robust watermark is not perceptually adapted, it might be applied at a relatively lower amplitude (gain) than is typically used with a perceptually-adapted watermark, so as to maintain imperceptibility (at the cost of less robustness). Thus, the maximum pixel change effected by a flat watermark might be on the order of half the maximum pixel change effected by a perceptually-adapted watermark (e.g., 2 digital numbers, vs. 5 digital numbers). The smaller pixel change means rail conditions will be less frequently encountered. So the rail exceptions needed to fully characterize the robust watermark are relatively less in number. These exceptions might be encoded within the robust payload—together with the other robust payload data.

A recipient of the watermarked image decodes the watermark payload. Using the decoded payload data, a flat watermark corresponding thereto is re-generated. Exceptions noted in the payload are accounted-for in the re-generated flat watermark, and the result is subtracted from the watermark-encoded image. What remains is the image without any artifacts of the original robust watermark encoding.

In another arrangement, a robust watermark is perceptually-adapted, and data characterizing this adaptation mask is sent as part of the robust watermark payload. To reduce the amount of this data, the perceptual-adaptation can be simplified to yield a less complex adaptation mask. One way to do this is to locally-set different gain values based on plural-pixel blocks (e.g., 2×2 or 8×8), rather than assigning each pixel a different gain value. Another is to limit mask gain to a restricted set of gain values, such as {0, 2, 8} or {0.5, 2}, rather than a less restricted set as typically used. Or the perceptual adaptation mask can be tailored with fore-knowledge of the compression algorithm to which it will be subjected to yield a smaller set of data for inclusion in the watermark payload (e.g., the mask can include repeated patterns that facilitate L-Z compression, or include lengthy runs of the same values to facilitate run-length encoding).

Again, a recipient of the watermarked image decodes the watermark payload. This time the payload is used to generate a flat watermark corresponding thereto, and this watermark is then perceptually-adapted in accordance with the mask data (and exceptions are taken into account). The thus re-created watermark is subtracted from the watermark-encoded image, yielding an image free of watermark-encoding artifacts.

Another approach to removal of a robust watermark is by reference to an estimated watermark and an error signal.

In this arrangement, an image I is encoded with a robust watermark, yielding an encoded image IW. The original watermark I is subtracted from the encoded image, isolating the changes caused by the watermark, termed W. This watermark W reflects all rail conditions, perceptual adaptations, etc.

A second watermark W' is generated with the same payload, but is left flat—without adaptation to the host image, without exceptions, etc. (In many embodiments, such a separate step is not necessary, as the flat watermark W' was generated as part of the image encoding, and a copy thereof can be maintained in the flat state.)

The difference D between the actual watermark and the flat watermark is then computed: D=W−W'. This difference frame constitutes all of the variations between the actual watermark and its flat counterpart. This difference signal is then compressed with lossless compression.

This difference signal can be conveyed with the image in a watermark payload, or stored.

The encoded image may then be reversibly watermarked (with the reversible watermark possibly including the compressed difference signal).

A recipient of the watermarked image removes the reversible watermark—if present. Next, a watermark decoding process is applied to the image to discern the robust watermark payload. Again, this payload is used to re-create a corresponding flat watermark signal. This flat signal is identical to the W' signal referenced in the encoding operation. The earlier-computed difference signal D is obtained, e.g., from a watermark payload or from its storage location. The actual watermark W still left in the image is then determined by summing the re-created flat watermark W' with the difference signal D, yielding the actual watermark W. This watermark W is then subtracted from the image (with any reversible watermark already removed). The result is the fully-restored original image—free from all watermarking artifacts.

More generally, this technique generates an estimation of the encoded watermark in a manner that can be performed at both the encoder and decoder to yield identical results. (Generating a flat watermark from the payload data is one way of doing this, but in alternative systems other approaches may be employed.) The difference between this estimated watermark and the encoded watermark is then computed, and made available to the decoder. (Again, the procedure noted above for computing this difference is illustrative only. It is not essential, for example, to isolate the encoded watermark signal from the watermarked image by subtracting the unencoded image—the actual watermark signal may be independently available.) At the decoder, the error signal is used in conjunction with the estimated watermark signal to fully identify all changes to the image made by the watermarking. The changes thus identified can be compensated for, e.g., by subtraction.

It will be recognized that the foregoing principles can be modified in numerous ways, as best fits the application. For example, the error signal may have a structure indicating that greater compression can be achieved if the error signal is represented in another domain (e.g., by transforming into DCT or wavelet coefficients) prior to lossless compression. Likewise, the error signal may have an underlying repetitive pattern that can be represented once, and applied repeatedly during the compensation process. Still further, the error signal need not be a difference signal. Nor need it be additively combined with the estimated watermark during the compensation process. Instead, the error signal can be such that multiplication, convolution, dot product, or other image processing operator can be used in applying compensation.

A related application also employs a reversible watermark in conjunction with a robust watermark. In this application, however, one of the watermarks conveys metadata associated with the image, whereas the other conveys a link to a data repository having at least some of the same metadata. By this arrangement, a recipient of an uncorrupted image can decode the watermarked metadata, store this data locally for future reference, and then remove one or both watermarks from the image—enhancing the image quality. If, on the other hand, the image is corrupted prior to its receipt, the payload conveyed by the reversible watermark is lost. If its payload is image metadata, this data can be restored by decoding the robust watermark, linking to the specified repository, and obtaining a copy of the metadata from the repository. If its payload is the linking information, the metadata conveyed by the robust watermark persists.

Whether the metadata is recovered from the payload of an image watermark, or obtained from a remote store indexed by a watermark payload, it can be stored in a memory associated with the image recipient (e.g., in a database or the user's workstation). If desired, the watermark conveying the linking information can be removed from the image, and the image then re-watermarked with new linking information—this time pointing to the memory in which the metadata has been newly stored. As before, one or both of the watermarks can be removed, if access to the pristine image is required.

Such arrangements are particularly advantageous in connection with imagery that is normally maintained in an organization's digital asset management (DAM) system, but is sometimes distributed externally. The original watermark link can point to a record in the originating DAM system registry where corresponding metadata is stored. If the image leaves this environment, the data carried by the watermark can replicate the corresponding registry entry in a disconnected environment (e.g., establishing a local image registry).

As in the arrangements earlier described, the watermark may also convey hash data or other information by which the image can be authenticated.

In a related application, the encoding parameters of the robust watermark can be stored in a memory, and accessed through linking data encoded in one of the watermarks.

Another application builds on the arrangements just-disclosed. When an image is first acquired (or first-entered into an asset management system), it is watermarked with both robust and reversible watermarks. Among other data, the robust watermark conveys an image version number, and a link to a database entry where information about the image is stored.

When a user accesses the image, the watermarks are decoded and their contents are stored locally. The image is then processed to remove the watermarks, and successful image restoration is checked by reference to hash data. Actions taken by the user are appended to an audit log that is maintained as part of the database record for that image. The level of detail logged depends on the particular application, but may include the name of the user, an identification of the user's computer, date/time, keystroke logging, edits made, annotations made, etc. (Where image processing actions taken by the user are reversible, the log may specify the steps in sufficient detail to allow the actions to later be fully reversed.) At conclusion of the user's processing, the image is re-watermarked, with the version number updated in the robust watermark. Parameters necessary for the next user to remove the robust watermark are included as watermark payload data, or stored in the database record.

An exemplary database record for an image may have a structure including the following XML-tagged entries:

TABLE I

<Original Name> PORTLANDORX1B2680.BMP
<Original Image Date> 12/11/02
<Original Image Time> 17:30:04
<Spectral Band nm> 680
<Acquisition Platform> Landsat 99
<Max Latitude> 45.565
<Min Latitude> 45.488
<Max Longitude> 122.621
<Min Longitude> 122.728
<Image Quality> 5
<Original Hash> FC43B73A
<Original Robust WM Method> 881
<Original Robust WM parameters> {...details...}
<Original Classification> Restricted-C
<Transaction/Version ID> A1
<Personnel Name> SmithJohnA
<Personnel Badge Number> FB04166
<Workstation ID> FB98146
<Date> 12/12/02
<Start Time> 08:39:54
<Action Taken A1_1> Open PORTLANDORX1B2680.BMP
<Action Date-Time A1_1> 12/12/02 08:39:54
<Action Taken A1_2> Check Restrictions - passed
<Action Date-Time A1_2> 12/12/02 08:39:55
<Action Taken A1_3> Read WMs - passed {...payload details...}
<Action Date-Time A1_3> 12/12/02 08:39:56
<Action Taken A1_4> Remove frail WMs - passed
<Action Date-Time A1_4> 12/12/02 08:39:58
<Action Taken A1_5> Remove robust WM - passed
<Action Date-Time A1_5> 12/12/02 08:39:59
<Action Taken A1_6> Check hash - passed
<Action Date-Time A1_6> 12/12/02 08:40:00
<Action Taken A1_7> Crop: (1491, 2200, 800, 1600)
<Action Date-Time A1_7> 12/12/02 08:41:15
<Action Taken A1_8> Auto Enhance Contrast
<Action Date-Time A1_8> 12/12/02 08:42:33

TABLE I-continued

<Action Taken A1_9> Encode Robust WM: {...A1, other payload details...}
<Action Date-Time A1_9> 12/12/02 08:43:05
< Robust WM parameters A1> {...details...}
<Action Taken A1_10> Encode Frail WM: {...payload details...}
<Action Date-Time A1_10> 12/12/02 08:43:06
<Action Taken A1_11> Assign Classification: Restricted-D
<Action Date-Time A1_11> 12/12/02 08:43:09
<Action Taken A1_12> SaveAs: PORTLANDORX1B2680A1.TIF
<Action Date-Time A1_12> 12/12/02 08:43:12
<Transaction/Version ID> B1
<Personnel Name> DoeJaneB
<Personnel Badge Number> DOD4234
<Workstation ID> DOD20022422
<Date> 12/13/02
<Start Time> 012:39:44
<Action Taken B1_1> Open PORTLANDORX1B2680A1.TIF
<Action Date-Time B1_1> 12/13/02 12:39:44
<Action Taken B1_2> Check Restrictions - passed
<Action Date-Time B1_2> 12/13/02 12:39:45
<Action Taken B1_3> Read WMs - passed {...payload details...}
<Action Date-Time B1_3> 12/13/02 12:39:46
<Action Taken B1_4> Remove frail WMs - passed
<Action Date-Time B1_4> 12/13/02 12:39:48
<Action Taken B1_5> Remove robust WM - passed
<Action Date-Time B1_5> 12/13/02 12:39:50
<Action Taken B1_6> Check hash - passed
<Action Date-Time B1_6> 12/13/02 12:39:51
<Action Taken B1_7> Close
<Action Date-Time B1_7> 12/13/02 13:45:47

In the example just given, the log shows that user John Smith opened the original image, removed the watermarks, edited the image, and stored the edited version under a new name. The edited version was watermarked with frail and robust watermarks. The robust watermark payload indicated that the new version is version "A1."

Due to changes in the image and the watermark, the parameters earlier used to remove the original robust watermark from the original image would no longer suffice to remove the new robust watermark from the edited image. Accordingly, revised parameters are collected and logged in the database record. (As earlier indicated, these parameters could also be conveyed via a watermark in the edited image.)

The database record indicates the algorithm by which the original robust watermark was applied (i.e., the method detailed in the cited '881 application). If the version A1 had been robustly watermarked using a different algorithm, the audit trail data would have reflected this detail.

The foregoing table does not show the location at which the edited version "A1" of the image was stored, but this information could naturally be included in the database, or it could be conveyed in a watermark. (In some systems, the edited version may be stored in the same subdirectory as the original image. In others, the edited version may be stored elsewhere, e.g., on Smith's workstation, in a different image library, etc.)

User Jane Doe later opened the edited "A1" image (removing the watermarks) and viewed it. However, she did not edit or otherwise change the image, so it was not necessary to store updated parameters for removal of the robust watermark at the end of her session.

The foregoing example is illustrative only. In actual implementation, more complex database records—with more data and different types of data—may commonly be employed.

As noted, some or all of the information stored in the database record may alternatively—or additionally—be conveyed with the image, as part of a watermark payload.

Figure 4:
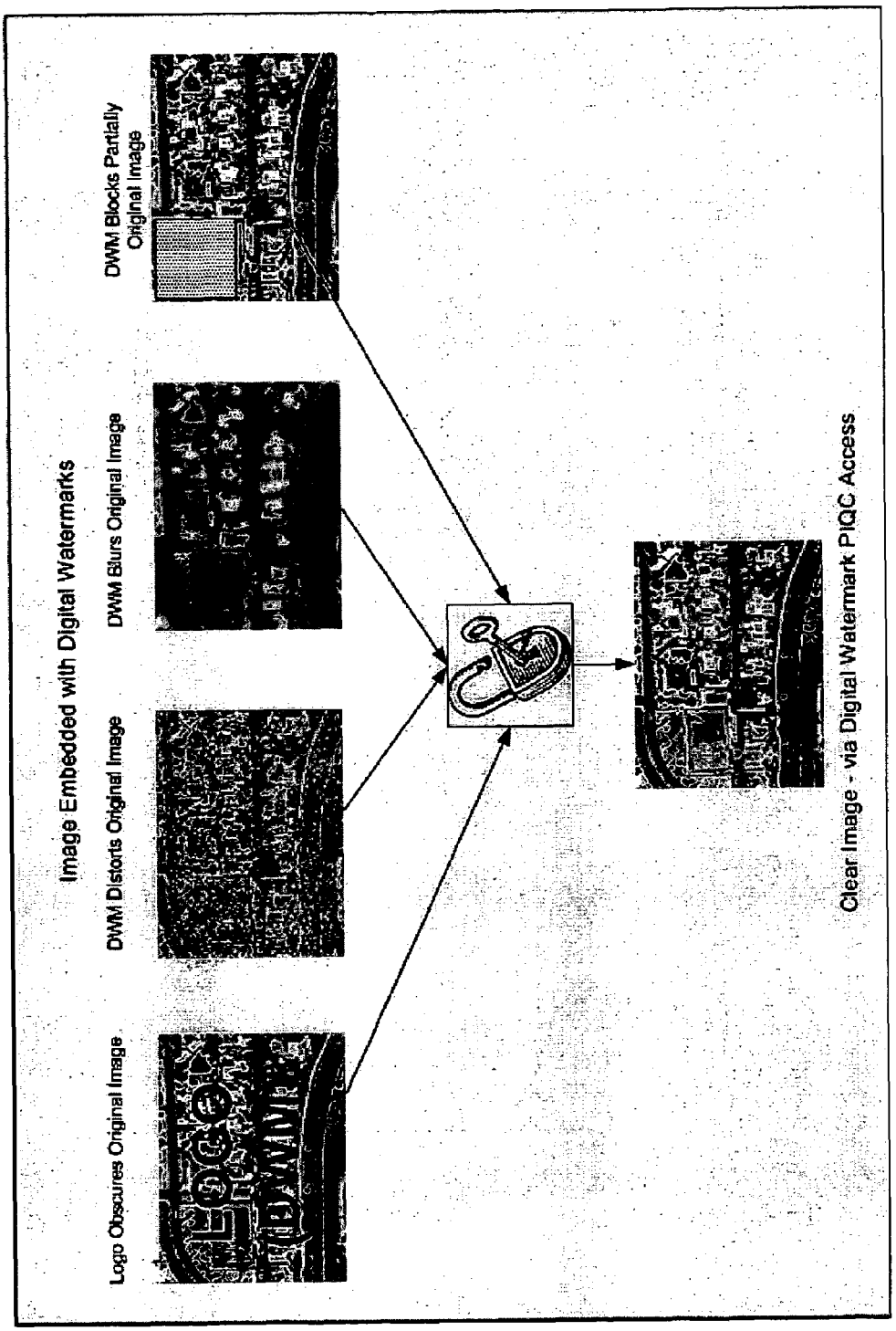
FIG. 4 shows how an image may be corrupted for general distribution, and restored by suitably-qualified recipients.

Referring to FIG. 4, another embodiment according to the present invention permits different classes of consumers to gain access to different versions of an image (so-called "Progressive Image Quality Control" or PIQC). A pristine image is intentionally degraded in some fashion, and distributed to consumers. By reference to one or more watermarks in the degraded image, some or all of the degradation can be removed, or transformed to a less-objectionable state. (The degradation may be that introduced by watermark encoding, or of another form.) Through such arrangements, image consumers with different authorization rights can gain access to versions of the image having differing qualities.

In one embodiment, an image is encoded with a reversible watermark. The watermark may effect a degradation ranging from very slight to very severe—depending on the application context. A first recipient does not have the information or tools needed to reverse the watermarking operation, and so is left to use the image in its degraded state. A second recipient has the means to reverse the watermark and—after doing so—can use the image in its pristine state.

In such an embodiment employing the form of reversible watermark taught by Tian, the second recipient may have the key with which the watermark was encoded. With this key the watermark can be decoded. The decoded watermark yields a payload (map data) that can then be used to fully remove the watermark from the image. (In an exemplary embodiment, the watermark spans the entire image, changing most if not all of the image pixels.)

In most such embodiments, the reversible watermark will convey other information as well, such as the payload contents discussed in connection with the foregoing embodiments.

The watermark key may be sent to authorized viewers in various ways. In some embodiments, the key may be sent in encrypted form using, e.g., RSA, DES or PGP encryption, or scrambled by XOR'ing with a psuedo-random sequence. An authorized user can decrypt the watermarking key and utilize the key to decode and remove the watermark.

The encrypted key may be included as part of a watermark payload conveyed with the degraded image itself. In one such embodiment, the image has two reversible watermarks. The first is as just described. The second is publicly-keyed—using a watermark key that is generally known (e.g., hex FFFF). This second watermark functions just to convey the watermark key of the first watermark and does not need to visibly degrade the image. When decoded, this second watermark yields the encrypted key associated with the first, degrading watermark. Recipients who can decrypt this key can remove both the publicly-keyed watermark, and the degrading watermark.

Alternatively, the degrading watermark may have been encoded with a key already known to or associated with the second recipient (either with the person individually, or associated with a group to which the person belongs, such as a classification rank). (Many secure computing environments associate digital credentials with users, e.g., storing cryptographic keys in secure storage on a user's computer.) Software or hardware associated with the second recipient's computer may apply one of these keys to decode and remove the degrading watermark from the image—either at the second recipient's instruction (e.g., through known user interface paradigms, such as a "Remove Watermark" button in a graphical user interface), or the decoding/removal may occur automatically—without action by the second recipient. The first recipient—without the second recipient's key—is left with the degraded image.

In yet other arrangements, some or all of the key data may also be derived from the content data itself, such as a hash of the image (using a hashing algorithm that may be public or secret). Such key derivation may take place either before or after watermark removal.

(Combinations of the foregoing key distribution/application techniques, and other key management arrangements known to artisans in the cryptographic arts, can of course be used. For example, a key conveyed in a watermark can be combined with a key associated with a user and earlier stored on the user's computer, to yield key data useful in the embodiments described herein.)

In a related embodiment, an image is degraded by the watermark 'A' of the foregoing embodiment, and by a further, second degrading watermark 'B.' The key for this second degrading watermark 'B' may be known or available to a select group of persons. Any member of this group can—with this key—decode and remove the second watermark (which, like the first, may encompass all image pixels). They then have access to the image degraded by just a single watermark 'A.' One or a few members of this select group may also have the first key—the one needed to remove the original watermark 'A' and finally restore the image to its un-degraded state.

In such an arrangement, there are thus 3 groups of image recipients, as detailed in table II:

TABLE II

| Group | Can Remove Watermark |
| --- | --- |
| 1 | None |
| 2 | B |
| 3 | A, B |

In this example, it was assumed that separate keys are needed for removal of watermarks A and B, and that members of Group 3 must thus have two distinct keys. In some embodiments it is possible for a single key held by Group 3 members to serve to remove both watermarks A and B, while being distinct from the key needed by members of Group 2.

The principles of the foregoing embodiment can likewise be extended to any number of levels of image degradation, with different classes of recipients qualified to remove differing amounts of the degradation. An arrangement with three different degrading watermarks is shown in Table III:

TABLE III

| Group | Can Remove Watermark |
| --- | --- |
| 1 | None |
| 2 | C |
| 3 | B, C |
| 4 | A, B, C |

In these examples, each successively-higher level of image quality requires removal of all watermarks removed for lower levels, and one more. This is exemplary but not necessary. In other embodiments, different combinations of watermarks may be removed by different classes of recipients, e.g:

TABLE IV

| Group | Can Remove Watermark |
| --- | --- |
| 1 | None |
| 2 | C |
| 3 | B |
| 4 | B, C |
| 5 | A |

TABLE IV-continued

| Group | Can Remove Watermark |
|---|---|
| 6 | A, C |
| 7 | A, B, C |

In this arrangement, the different watermarks A, B, C may introduce different degrees of distortion, with C the least and A the most. These may (but need not) be binary weighted, e.g., B introduces twice the distortion of C, and A introduces twice the distortion of B, etc.

There are various ways that such arrangements may be implemented. One is to assign different pixels or areas of the image to different watermarks—with no pixel or area being associated with more than one of the watermarks. (The pixels can be assigned to the different watermark groupings randomly, in a tiled basis, or otherwise. Naturally, it is usually desirable for the pixels associated with the differing watermarks to be interspersed in some fashion.) To effect the differing levels of degradation for the differing watermarks, the pixels altered by watermark C may comprise roughly one-seventh of the total image area, with watermark B spanning two-sevenths of the image area, and watermark A encompassing four-sevenths of the image area. Thus, a user in Group 1 who is able to remove only watermark 'C' is able to restore only one-seventh of the pixels to their original values, etc.

Another way in which the Table IV arrangement can be implemented again relies on assignment of different watermarks to different pixels or areas of the image. However, instead of changing the number of pixels/areas to effect differing image degradation, the magnitudes of the watermarks may be changed. In such an arrangement, for example, the average absolute value change of an 8-bit pixel effected by watermark C may be 2 digital numbers, whereas the change effected by watermark B may be 8 digital numbers, and the change effected by watermark C may be 32 digital numbers. The pixel areas allocated to these three watermarks may be equal (although this is not necessary). Again, an arrangement in which the assignment of watermarks to different pixels spreads each watermark throughout the image (interspersing) is generally desirable.

In still other embodiments, combinations drawing from various of the above-described techniques can be utilized.

Again, the key application/distribution techniques described earlier can be used in these and the later-described embodiments.

Another way of providing different versions of an image to different recipients, from a commonly watermarked image, is to degrade the image by a corruption function (e.g., a gaussian blur, or re-quantizing to just 16 grayscale levels from 256), and then watermark the degraded image. The watermark in such embodiment can point to a store where accessory information useful in ameliorating the corruption is stored. The pointer may be, for example, an IP address or a URL for the accessory information, or may be an index to a database entry at which such an IP address or URL, or the ultimate accessory information itself, is stored. From the pointed-to repository the image recipient can obtain ameliorating information. This ameliorating information may comprise, e.g., a correction image that—when combined (e.g., summed or multiplied on a per-pixel basis, convolved, etc.) with the corrupted (blurred) image yields the original, pristine, image.

It will be recognized that the blurring function is exemplary only. Any image modifying function can be employed. Desirably, the corruption is such that the image has some—albeit impaired—utility without correction. Moreover, as described earlier, it will be recognized that the image may be subjected to several such corruptions—with different classes of users being able to reverse different ones (or combinations) of the corruptions.

The correction effected by combination with the correction image may also serve to reverse the watermarking effect (whether robust or frail). Or the watermark may be a reversible type that can be separately removed—either before or after the amelioration.

It will be recognized that in this and the earlier-described embodiments, the corruption/degradation may be spatially limited to one, or a few, regions of the image. Different regions may be corrupted, and ameliorated, through use of different watermarks. These watermarks may be encoded in the corrupted regions to which they correspond, or elsewhere.

Instead of a corruption function that leaves the image with some semblance of its original self (e.g., blurred), the corruption function can entirely obliterate part of the image. For example, one or more rectangular blocks of image pixels can be encrypted (scrambled). Unless ameliorated (such as by one of the foregoing techniques, e.g., decoding a watermark to obtain a decryption key—or a link to a store where a decryption key is kept, and applying the decryption key to the scrambled block of data), the block looks like noise when viewed. (In the parenthetical example just given, it will be recognized that reading of the watermark may require a key distinct from that which which the image block is scrambled.)

Relatedly, certain image area(s) can be set to all-black, all-white, all-gray, or other arbitrary pattern (e.g., black-white checkerboard). Again, an authorized viewer can use watermark data encoded in such regions—or elsewhere—to ameliorate the corruption and restore the image to a better (or perfect) state (e.g., the store can include image blocks without impairment, or with less impairment, that can be substituted into the corrupted regions).

In still other embodiments, the corruption can be effected by an obscuring visual overlay. One example is a visible logo of the image proprietor. Another is annotations that have been added to the image by a person who reviewed the image and wants to store comments on the image (e.g., a radiologist's diagnostic notes).

Such overlay corruption can be handled in various ways. One is to form a bit-mapped graphic comprising, e.g., handwritten notes in black color. This graphic is then overlaid over the original image—replacing certain of the original pixel values with black pixels (value=0). A difference image—comprising the marked-up image subtracted from the original image—is stored in a remote store. The modified image is then reversibly watermarked with a payload indicating an address corresponding to the remote store. When the image is transferred to another viewer, it is initially rendered with the handwritten notes obscuring part of the image. To remove the handwriting, the watermark is first decoded and removed. The watermark payload is then used to access the remote store. The difference image is then added to the corrupted image—restoring the corrupted pixels to their original values.

If the second viewer wants to make additional annotations to the image, the process can be extended. If the second annotations are to always appear with the first annotations, a new difference image—reflecting both sets of annotations—can be created and stored in a remote store. The twice-annotated image is then re-watermarked—with the watermark pointing to the store containing the new, augmented difference image.

If the second viewer wants to preserve viewability of the image with just the first set of annotations, while also storing a second set of annotations, a difference image corresponding just to the second set of annotations (relating to the image with the first annotations) can be stored in a second store. A second watermark can then be applied to the corrupted image. A third image viewer will receive the image with both annotations visible. By decoding and removing the second watermark, the third viewer can link to the second store, and add the difference image corresponding to the second overlay—removing the second viewer's annotations from the image, leaving just the image with the first annotations. If the third viewer wants to see the image in its pristine state—without even the first annotations—the viewer can decode and remove the first watermark, link to the first store, and add the difference image corresponding to the first overlay—removing the first annotations from the image.

It will be recognized that the arrangement just-described entails removing the corruptions in the reverse of the order in which they were effected, i.e., Add annotation 1

Add annotation 2

Remove annotation 2

Remove annotation 1

In this regard, such arrangements are akin to that detailed in Table II, above, with removal of watermark B required before removal of watermark A. Other arrangements are possible, e.g., in which the annotations are independently removable—rather than in a prescribed order. Such arrangements may, for example, map different of the annotations to different sets of interspersed pixels, as was done in connection with the Table IV arrangement, above. For example, the image may be tiled into blocks of 2×2 pixels. The upper left pixel of each block can be dedicated for use with a first annotation, the upper right pixel can correspond to a second annotation, etc. (This arrangement is illustrative only. Different pixel assignments, e.g., random, may be preferable in other contexts.)

In the example just-given, it will be recognized that the image corruption is not strictly deleterious. Rather, it has utility—enhancing use or understanding of the image in some contexts. Yet the corruption can be removed if desired.

Other image enhancements can be similarly reversible. For example, highlighting, bolding, increasing contrast, coloring, and other visually distinctive effects can be applied to sub-parts of an image to draw a viewer's attention to regions of potential interest. Again, these effects can be reversed through use of one or more watermarks conveyed with the image, as described above.

The technique just described is not the only way to realize an overlay of a logo or graphic. In another approach, the logo/graphic overlay is effected by altering the values of the affected image pixels in a distinctive way, such as the techniques used in broadcast television to superimpose a network logo in the lower right corner of a viewing screen. A variety of such techniques are known in the art, and are suitable here. One particular technique scales the luminance/grayscale values of affected pixels by a multiplicative scale factor, such as 0.5. The logo/graphic will then stand out as a darker pattern in the image.

In such cases, the watermark need not point to a remote store for ameliorating information. Instead, the watermark can convey a compressed form of the logo (e.g., a compressed map, a vector representation, a set of run-length data, etc.), together with identification of an anchor pixel location (e.g., lower left corner of bounding box encompassing logo). An image recipient can then decode the watermark, uncompress or otherwise generate the logo pattern from the payload data, and multiply pixels determined to be affected by the pattern by a complementary value of 2.0 to reverse the image corruption.

It will be recognized that the technique just-described is not perfectly-reversible. That is, the scaling by 0.5 leaves some ambiguity—did a post-scaling value of 11 derive from an original pixel value of 22 or 23? In most cases this one bit error will be acceptable. In situations in which it is not, other, fully-reversible pattern-imposing algorithms can be applied. For example, pixels corresponding to the logo region can each be summed with 128, with wrap-around from 255 to 0 (e.g., a pixel with initial value of 255 has a value after logo-superposition of 127). The transitions at the edges of these regions will make the logo apparent, even through the "fill" of the logo appears like lightened or darkened image data. A recipient of such an image can decode and remove the watermark, determine the shape and position of the overlaid logo from the compressed logo representation and anchor data in the watermark payload, and then remove the corruption by subtracting 128 from each pixel in the affected regions (again, with wrap-around from 0 to 255 as necessary).

It will be recognized that removal of the image corruption in the embodiments described above requires that the image not be further distorted. Any further distortion (e.g., image compression, rotation, filtering, scaling, printing/scanning) causes the reversible watermark(s) to become irreversible. This has the often-desirable effect of freezing the image in its currently-accessed quality state—preventing any higher quality from being obtained.

The watermark(s) can introduce such slight changes that the existence of the watermark(s) is imperceptible. Many recipients may be unaware that further levels of image quality are obtainable.

Although the foregoing description has focused on image-based applications, the same principles are likewise applicable to other host data sets. These include audio, video, 3D models, software, etc. (It will be recognized that "perceptually similar" isn't a useful metric for software—unlike content data types that commonly can withstand some measure of distortion. Thus, embodiments applying these techniques to software require that the watermarking artifacts be completely removed in order for the software code to be executed. Without complete and accurate removal, the watermark acts as a software disabler—akin to encryption. The watermark in such applications thus serves as a security measure, as well as a channel to convey auxiliary information.)

The consumers of the encoded content can put it to various uses. A video may be used for entertainment; an image may be used for medical diagnosis or geospatial mapping purposes, etc., etc.

Likewise, although the detailed arrangements effected watermarking in the pixel (spatial) domain, the same principles are likewise applicable to other methods. For example, techniques that encode a watermark payload through changes in a transform domain (e.g., wavelet, DCT) can of course be used. And in some embodiments, different of the watermarks may be encoded in different domains, e.g., the first—robust—watermark may be encoded in the DCT domain, whereas the second—frail—watermark may be encoded in the pixel domain; the first watermark may be encoded in the pixel domain prior to image compression, whereas the second watermark may be encoded after image compression, etc. Similarly, while the detailed arrangement effected the robust watermark encoding through an additive process, other processes are known and can also be employed.

The key distribution and application techniques taught in connection with the FIG. 4 embodiments can also be applied to the other embodiments. In like fashion, features of the other embodiments can be applied in the context of the FIG. 4 embodiments.

The arrangements detailed herein can also employ tamper-recovery features as detailed in the cited Tian references. By such arrangements, if a portion of an image is lost to tampering or other corruption, it can be largely (or completely) reconstructed by reference to reconstruction data stored elsewhere in the image (e.g., the four blocks having common sides with a corrupted block may have watermarks that convey—collectively—JPEG2000 image coefficients needed to fully reconstruct the image data originally found in the corrupted block).

It will be recognized that cryptographic keying of any of the watermarks detailed above creates a highly secure channel. If the watermark is tailored to be substantially imperceptible, this secure channel is also covert.

The arrangements detailed above do not increase the size of the image (e.g., a 640×480 pixel image represented with 8-bits per pixel has these same attributes after encoding). If desired, the image size can be increased to increase the watermark channel capacity (e.g., changing 8-bit pixel depths to 16-bits).

The payload data conveyed by the watermarks is essentially unlimited in type. In addition to the types noted above and in the cited documents, the payloads can also convey vector graphic data, imagery, encryption keys, digital signatures, etc. Moreover, payload data that is included in one watermark can also be included in a second watermark conveyed with the same image.

In the examples given, an image was first robustly watermarked, and then a frail (reversible) watermark was applied to the robustly-watermarked content. This is normally the protocol, since most frail reversible watermarks cannot be removed if the content is thereafter changed. But since the present application also teaches how robust watermarks may be removed, it is possible to apply a frail reversible watermark to an object, and thereafter apply a robust watermark to the encoded content. On the decoding side, the robust watermark is first removed. The content is then in the same state as after the frail reversible watermark was first applied, so it can now be removed. Thus, embodiments of the present invention can layer different combinations of robust and frail reversible watermarks on top of each other, with the layered watermarks removed in the reverse order. (The Tian difference-expansion frail reversible watermark technique is itself well adapted to iterative, or hierarchical, application of several frail watermarks.)

Although not belabored, it will be understood that the methods detailed herein can be performed using dedicated hardware, or programmable hardware in conjunction with suitable programming instructions (e.g., a Pentium workstation, having software instructions stored on disk and transferred to RAM memory or processor cache for execution, can be used as an encoding processor, and a similar arrangement can be used as a decoding processor).

To provide a comprehensive description without unduly lengthening this specification, the patent and journal documents reference above are incorporated herein by reference.

In view of the great number of different embodiments to which the principles of our inventive work can be put, it should be recognized that the detailed embodiments are illustrative only and should not be taken as limiting the scope of the invention. Rather, we claim as our invention all such embodiments as may come within the scope and spirit of the following claims, and equivalents thereto.

We claim:

1. A method of making available different versions of a content object to different recipients, comprising:
   providing the same object to first and second recipients, said object having at least a potion therefore of impaired quality;
   the first recipient using first key data to access a separate store of information having information useful in ameliorating said impairment, said first key data not being available to the second recipient; and
   using a processor, in conjuction with information from said separate store, to ameliorate the impairment in the object provided to the first recipient;
   wherein the first and second recipients are provided different versions of the object.

2. The method of claim 1 in which the first key data permits the first recipient to decode a digital watermark in the object.

3. The method of claim 2 in which the decoded digital watermark contains information used in accessing said separate store of information.

4. The method of claim 1 wherein the first recipient uses data that is not known to the second recipient to decode plural-bit information from a watermark encoded in the object.

5. The method of claim 4 which the first key data is a function of said decoded information.

6. The method of claim 5 in which the first key data is also a function of a digital credential already associated with the first recipient by reason of a classification rank of that recipient.

7. The method of claim 1 in which said portion of the object is encrypted, and the separate store of information includes a decryption key.

8. The method of claim 1 in which said portion of the object has been degraded by an obscuring additive overlay, and the separate store of information includes data by which this overlay can be removed.

9. The method of claim 1 in which the separate store holds a corresponding portion of said object without said impairment.

10. A method of making available different versions of a content object to different recipients, comprising:
    providing the same object to first and second recipients, said object having at least a portion therefore of impaired quality, said object being encoded with a plural-bit digital watermark;
    the first recipient using first key data to access first payload data from the digital watermark, the first payload data comprising information useful in ameliorating said impairment, said first key data not being available to the second recipient; and
    using a processor, in conjunction with said information, to ameliorate the impairment in the object provided to the first recipient;
    wherein the first and second recipients are provided different versions of the object; and
    wherein said portion of the object is encrypted, and the first payload data comprises a decryption key.

11. A method of making available different versions of a content object to different recipients, comprising:
    providing the same object to first and second recipients, said object having at least a potion therefore of impaired quality, said object being encoded with a plural-bit digital watermark;
    the first recipient using first key data to access first payload data from the digital watermark, the first payload data comprising information useful in ameliorating said impairment, said first key data not being available to second recipient; and using a processor, in conjunction with said information, to ameliorate the impairment in the object provided to the first recipient;

wherein the first and second recipients are provided different versions of the object; and wherein said portion is encrypted, and the first payload data comprises a link to a repository at which a decryption key is stored.

12. A method of making available different versions of a content object to different recipients, comprising:

providing the same object to first and second recipients, said object having at least a portion therefore of impaired quality, said object being encoded with a plural-bit digital watermark;

the first recipient using first key data to access first payload data from the digital watermark, the first payload data comprising information useful in ameliorating said impairment, said first key data not being available to the second recipient; and using a processor, in conjunction with said information, to ameliorate the impairment in the object provided to the first recipient;

wherein the first and second recipients are provided different versions of object; and wherein the content object comprises a digital image;

said portions is replaced with non-image data, and the first payload data comprises a link to a repository at which substitute image data is stored.

13. A method of making available different versions of a content object to different recipients, comprising:

providing the same object to first and second recipients, and object having at least a portion therfore of impaired quality, said object being encoded with a plural-digital watermark;

the first recipient using first key data to access first payload data from the digital watermark, the first payload data comprising information useful in ameliorating said impairment, said first key data not being available to the second recipient; and using a processor, in conjunction with said information, to ameliorate the impairment in the object provided to the first recipient;

wherein the first and second recipients are provided different versions of the object; and wherein said portion has a graphic formed thereon, and the first payload data comprises a link to a repository at which data for removing said graphic is stored.

14. The method of claim 13 in which said repository has object data stored therein that, when combined with said portion, restores original object data.

15. A method of making available different versions of content object to different recipients, comprising:

providing the same object to first and second recipients, said object having at least a portion therfore of impaired quality, said object being encoded with a plural-bit digital watermark;

the first recipient using first key data to access first payload data from the digital watermark, the first payload data comprising information useful in ameliorating said impairment, said first key data not being available to the second recipient; and using a processor, in conjunction with said information, to ameliorate the impairment in the object provided to the first recipient;

wherein the first and second recipients are provided different versions of the object; and wherein the object comprises a digital image;

said portion has a graphic formed thereon; and the first payload data includes pattern data identifying changed pixels comprising said graphic, so that a complementary process can be applied to reverse said impairment.

16. A method of making available different versions of a content object to different recipients, comprising:

providing the same object to first and second recipients, said object having at least a portion thereof of impaired quality, said object being encoded with a plural-bit digital watermark;

the first recipient using first key data to access first payload data from the digital watermark, the first payload data comprising information useful in ameliorating said impairment, said first key data not being available to the second recipient; and using a processor, in conjunction with said information, to ameliorate the impairment in the object provided to the first recipient;

wherein the first and second recipients are provided different versions of the object; and wherein said watermark is frail, and cannot be read if the encoded object is further altered.

17. A method of making available different versions of a content object to different recipients, comprising:

providing the same object to first and second recipients, said object having at least a potion therfore of impaired quality, said object being encoded with a plural-bit digital watermark;

the first recipient using first key data to access first payload data from the digital watermark, the first payload data comprising information useful in ameliorating said imapairment, said first key data not being available to the second recipient; and using a processor, in conjunction with said information, to ameliorate the impairment in the object provided to the first recipient;

wherein the first and second recipient are provided different versions of the object; and wherein said portion of the object has been degraded by an obscuring additive overlay, and the first payload data comprises information through which this overlay can be removed from the object.

18. A method of making available different versions of a content object to different recipients, comprising:

providing the same object to first and second recipients, said object having at least a potion thereof of impaired quality, said object being encoded with a plural-bit digital watermark;

the first recipient using first key data to access first payload data from the digital watermark, the first payload data comprising address data identifying a remote resource where information useful in ameliorating said impairment is stored, said first key data not being available to the second recipient; and using a processor, in conjuction with said information, to ameliorate the impairment in the object provided to the first recipient;

wherein the first and second recipients are provided different versions of the object.

* * * * *

UNITED STATES PATENT AND TRADEMARK OFFICE
CERTIFICATE OF CORRECTION

| | | |
|---|---|---|
| PATENT NO. | : 7,515,730 B2 | Page 1 of 1 |
| APPLICATION NO. | : 10/319413 | |
| DATED | : April 7, 2009 | |
| INVENTOR(S) | : Tian et al. | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 1209 days Delete the phrase "by 1209 days" and insert -- by 1878 days --

Signed and Sealed this

Thirteenth Day of April, 2010

David J. Kappos
*Director of the United States Patent and Trademark Office*